United States Patent
Chen et al.

(10) Patent No.: US 11,631,886 B2
(45) Date of Patent: Apr. 18, 2023

(54) QUASI-SOLID-STATE ELECTROLYTE BASED ON IONIC LIQUID FOR USE IN LITHIUM BATTERY AND PREPARATION METHOD THEREOF

(71) Applicant: BEIJING INSTITUTE OF TECHNOLOGY, Beijing (CN)

(72) Inventors: Renjie Chen, Beijing (CN); Nan Chen, Beijing (CN); Feng Wu, Beijing (CN); Lili Wang, Beijing (CN); Yujuan Dai, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 602 days.

(21) Appl. No.: 16/699,729

(22) Filed: Dec. 1, 2019

(65) Prior Publication Data
US 2020/0185766 A1   Jun. 11, 2020

Related U.S. Application Data

(63) Continuation of application No. PCT/CN2017/000400, filed on Jun. 23, 2017.

(30) Foreign Application Priority Data

Jun. 1, 2017 (CN) .......................... 201710403805.4

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0074* (2013.01)

(58) Field of Classification Search
CPC ......... H01M 10/0562; H01M 10/0525; H01M 2300/0074
See application file for complete search history.

(56) References Cited

U.S. PATENT DOCUMENTS

| 2009/0280405 A1 | 11/2009 | Sannier et al. |
| 2013/0260207 A1* | 10/2013 | Uemura ............. H01M 50/409 521/134 |

FOREIGN PATENT DOCUMENTS

| CN | 102244292 A | 11/2011 |
| CN | 102930987 A | 2/2013 |
| CN | 105070946 A | 11/2015 |
| CN | 106058312 A | 10/2016 |

OTHER PUBLICATIONS

International Search Report on PCT/CN2017/000400 (Translation).

\* cited by examiner

*Primary Examiner* — Osei K Amponsah
(74) *Attorney, Agent, or Firm* — Yong Chen

(57) ABSTRACT

The present disclosure relates to an ionic liquid-based quasi-solid-state electrolyte in a lithium battery and a preparation method thereof. The quasi-solid-state electrolyte is of a porous network structure, which is obtained by a condensation reaction of a lithium salt, ionic liquid, a silane coupling agent and a catalyst, and has a high ionic conductivity. The quasi-solid-state electrolyte can stabilize a stripping/deposition process of lithium metal and inhibit growth of lithium dendrites, and shows a low overpotential and long-term cycle stability in a constant current polarization process. The interface impedance of a lithium metal sheet and the quasi-solid-state electrolyte is low, and is hardly increased with the age of the battery.

5 Claims, 2 Drawing Sheets

QUASI-SOLID-STATE ELECTROLYTE BASED ON IONIC LIQUID FOR USE IN LITHIUM BATTERY AND PREPARATION METHOD THEREOF

CROSS-REFERENCE TO RELATED APPLICATIONS

The application is a continuation of international patent application No. PCT/CN2017/000400 filed Jun. 23, 2017, which claims priority to Chinese patent application No. 201710403805.4 filed Jun. 1, 2017; the disclosure of each of these prior-filed applications is incorporated herein by reference in its entirety.

FIELD

The present disclosure relates to an ionic liquid-based quasi-solid-state electrolyte for use in a lithium battery and a preparation method thereof, and belongs to the technical field of lithium secondary batteries.

BACKGROUND

Lithium metal has the highest theoretical capacity (3860 mAh/g) and a very low reduction potential, and is a very ideal negative electrode. Using lithium metal as a negative electrode is crucial to development of Li—S batteries and Li—$O_2$ batteries. However, the problems such as lithium dendrite formation during charge-discharge cycle of batteries and low coulombic efficiency severely hinder the commercialization of the lithium metal battery. A stable lithium metal/electrolyte interface is a precondition for ensuring safety and long cycle life of the lithium metal battery. One of the improvement strategies is using a solidified electrolyte and the like instead of a liquid electrolyte, which avoids occurrence of lasting side reaction of the liquid electrolyte, while inhibiting lithium dendrite formation by using the mechanical and electrochemical properties of the solid electrolyte.

An ionic liquid has characteristics such as good thermal stability, high electrical conductivity, wide electrochemical window, low vapor pressure, and has a great application potential in terms of electrolyte material of lithium secondary batteries. Usually the ionic liquid exists in a liquid form at room temperature, and during long-term use of the battery, there is a risk of liquid leakage. Therefore, a quasi-solid-state electrolyte obtained after solidification of the ionic liquid will effectively improve the problem of leakage.

The material of the solidified ionic liquid can be classified into two types: one type is an organic polymer matrix, and the other type is an inorganic matrix. Such material has a porous network structure, which is primarily responsible for mechanical strength, and meanwhile provides a large adsorption space for the loaded ionic liquid. A research group of Chen Renjie reported a quasi-solid-state electrolyte in which ionic liquid was loaded on mesoporous $SiO_2$ or $TiO_2$ (Chem. Mater. 2016, 28, 848-856, Adv. Mater, 2011, 23, 5081-5085), but because $TiO_2$ and $SiO_2$ are electrochemically inactive materials in the operating voltage range of the battery, and do not have the ionic conduction function, ionic conduction of the ionic liquid is hindered, thereby resulting in a reduced electrical conductivity of the ionic liquid electrolyte after solidification. Patent CN106058312A reported a solidified ionic liquid electrolyte, a preparation method and application thereof, this electrolyte is a material which uses an epoxy ether group modified silica skeleton as solidified ionic liquid, and is suitable for use in the field of lithium secondary batteries. The C—O—C group on the epoxy ether group has lone pair electrons, and has a strong coordination with lithium ions, the introduction of the epoxy ether group effectively promotes dissociation of a lithium salt and migration of lithium ions. Therefore, the functional group linked to the silica skeleton to a great extent determines the physicochemical property of the system, and consequently has a large impact on the performance of the electrolyte. However, until now there have not been research reports on the application of the quasi-solid-state electrolyte obtained from organically modified silica-loaded ionic liquid in the lithium metal battery.

SUMMARY

Aiming at the problems of the existing lithium battery such as lithium dendrite formation and low coulombic efficiency during charge-discharge cycle, the purpose of the present disclosure of is to provide an ionic liquid-based quasi-solid-state electrolyte for use in a lithium battery and a preparation method thereof, wherein the electrolyte has a high ionic conductivity, can stabilize a stripping/deposition process of lithium metal, and inhibit growth of lithium dendrites. The process of the method is simple, the raw materials are easy to obtain, safe and pollution-free, and the method is suitable for large-scale batch production.

The purpose of the present disclosure is achieved by the following technical solution.

An ionic liquid-based quasi-solid-state electrolyte for use in a lithium battery, wherein the quasi-solid-state electrolyte is of a porous network structure, which is obtained by a condensation reaction of a lithium salt, ionic liquid, a silane coupling agent and a catalyst.

The lithium salt is one or more of $LiN(SO_2CF_3)_2$, $LiCF_3SO_3$ and $LiC(SO_2CF_3)_3$.

The ionic liquid is preferably an ionic liquid in which the anion is a bis(trifluoromethylsulfonyl)imide salt, more preferably one or more of 1-ethyl-3-methylimidazolium bis(trifluoromethylsulfonyl)imide, 1-propyl-3-methylimidazolium bis(trifluoromethylsulfonyl)imide, 1-butyl-3-methylimidazoliulm bis(trifluoromethylsulfonyl)imide, N-methyl,propylpiperidinium bis(trifluoromethylsulfonyl)imide, N-methyl,butylpiperidinium (bistrifluoromethylsulfonyl)imide, N-methyl,propylpyrrolidinium bis(trifluoromethylsulfonyl)imide, and N-methyl,butylpyrrolidinium bis(trifluoromethylsulfonyl)imide.

The silane coupling agent is an organosilicon compound containing an acryloyl group, preferably one or more of 3-methylacryloyloxypropyltrimethoxylsilane, γ-methylacryloyloxypropylmethyldimethoxylsilane, and 3-methylacryloyloxypropyltriethoxylsilane.

The catalyst is formic acid, acetic acid or water.

A preparation method of the ionic liquid-based quasi-solid-state electrolyte for use in the lithium battery according to the present disclosure includes the steps as follows:

(1) Firstly dissolving a lithium salt in an ionic liquid in a glove box filled with a protective gas and having a moisture content less than 1 ppm and performing uniform stirring to obtain an ionic liquid electrolyte; and then adding a silane coupling agent, performing uniform mixing, finally adding a catalyst, and performing uniform mixing to obtain a reaction system; and (2) Removing the reaction system obtained in the step (1) from the glove box, and placing the reaction system in a vacuum drying oven with a relative vacuum degree of −70

KPa to −100 KPa, and performing drying at 25° C.-90° C. to obtain the quasi-solid-state electrolyte.

In the ionic liquid electrolyte, the concentration of the lithium salt is 0.35 mol/L-2 mol/L; the mass ratio of the silane coupling agent to the ionic liquid electrolyte is (0.15-0.6):1; and the molar ratio of the catalyst to the silane coupling agent is preferably (5.5-8.5):1.

The protective gas is nitrogen gas or argon gas with a purity not less than 99%.

Beneficial Effects (1) The quasi-solid-state electrolyte according to the present disclosure has a porous network structure, and can load a great amount of ionic liquid; besides, the lone pair electrons of C=O and C—O—C on the acrylic functional group can form coordination with lithium ions, thereby promoting dissociation of the lithium salt, and increasing the number of free $Li^+$ in the electrolyte, therefore, the quasi-solid-state electrolyte according to the present disclosure has a high ionic conductivity ($10^{-3}$ S/cm-$10^{-2}$ S/cm, 0° C.~100° C.).

(2) The quasi-solid-state electrolyte according to the present disclosure can stabilize the stripping/deposition process of the lithium metal, and inhibit growth of the lithium dendrites, and shows a lower overpotential and long-term cycle stability during a constant current polarization process; the interface impedance of a lithium metal sheet and the quasi-solid-state electrolyte is small, and is hardly increased with the increase of age of the battery; the quasi-solid-state electrolyte has good high-temperature resistant performance, its thermal decomposition temperature is greater than 340° C., thereby enabling normal operation of the battery in a wide temperature range.

(3) For the quasi-solid-state electrolyte according to the present disclosure, the preparation process is simple, the equipments used are all conventional equipments, the raw materials are easy to obtain, safe and pollution-free, and the method is suitable for large-scale mass production.

DETAILED DESCRIPTION

The present disclosure will be further described in conjunction with the drawings and detailed embodiments.

In the following examples:

Assembly of the lithium symmetrical battery: in a glove box filled with argon gas having a purity greater than or equal to 99%, a lithium metal sheet, a quasi-solid-state electrolyte prepared in the example, a lithium metal sheet are successively placed in a button battery case of Type 2032, and then two sheet of battery cases are compacted and fastened by a tablet press to obtain a lithium metal symmetrical battery.

After the assembled lithium symmetrical battery is allowed to stand at 30° C. for 48 hours, an electrochemical performance test is conducted: a test of alternating current impedance is conducted at a electrochemical workstation (CHI660D, Shanghai Chenhua Instrument Co., Ltd), the frequency range of the test is 10 Hz-$10^5$ Hz, the AC amplitude is 5 mV, and the test temperature is 30° C.; a deposition/stripping test of lithium metal is conducted by using an LAND battery test system (Type CT2001A, Wuhan Jinnuo Electronic Co., Ltd), the constant current density of the test is 0.1 mA/cm², and the deposition capacity is 0.1 mAh.

Scanning electron microscope: Type Quanta 600, FEI Company, Holland;

Thermogravimetric analyzer: Type TG209F1, Netzsch Company, Germany.

Example 1

(1) In a glove box filled with argon gas having a purity greater than or equal to 99% and having a moisture content less than 1 ppm, firstly 0.91 g of $LiN(SO_2CF_3)_2$ was dissolved in 4.6 g of N-methyl,propylpyrrolidinium bis(trifluoromethylsulfonyl)imide, and stirred for 24 hours to obtain an ionic liquid electrolyte; then 2.8 g of 3-methylacryloyloxypropyltrimethoxylsilane was added and uniform mixing was conducted; and finally 2.5 mL of formic acid with a purity of greater than 98% was added, and stirring was continued for 8 minutes to obtain a reaction system; and (2) The reaction system obtained in the step (1) was removed from the glove box, and placed in a vacuum drying oven with a relative vacuum degree of −80 KPa, and dried at 50° C. for 7 days to obtain an ionic liquid-based quasi-solid-state electrolyte for use in a lithium battery.

Figure 1:
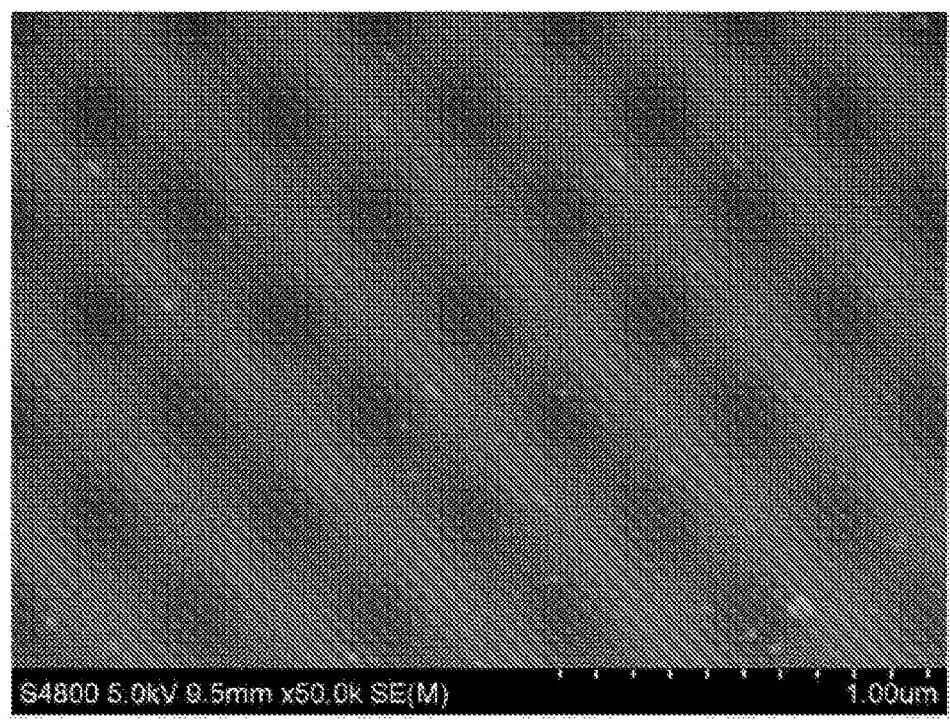
FIG. 1 is surface scanning electron microscope (SEM) image of the quasi-solid-state electrolyte prepared in Example 1.
Figure 2:
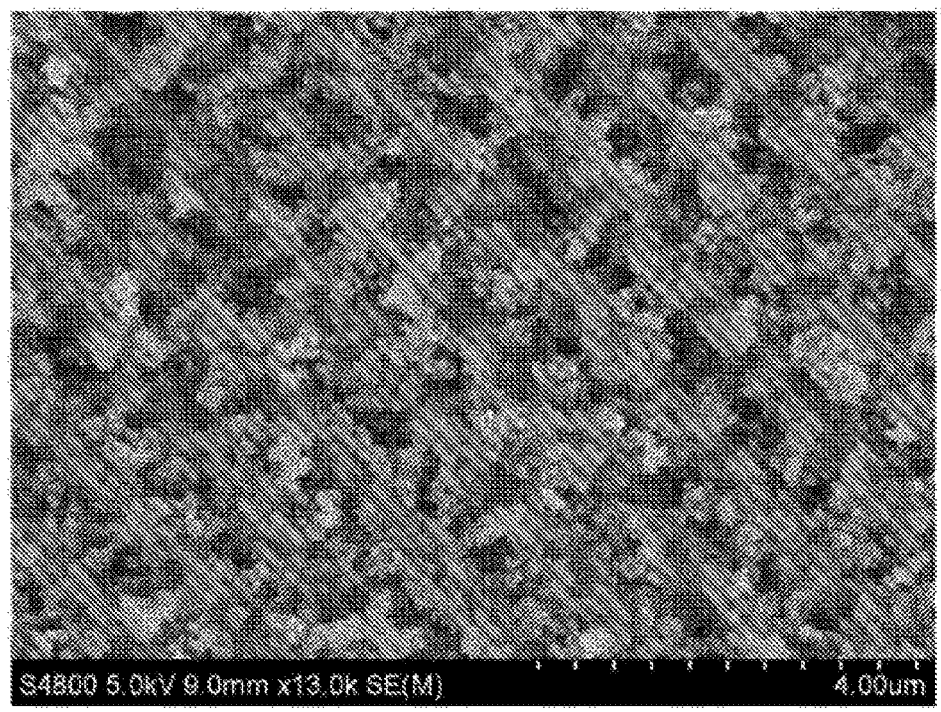
FIG. 2 is a scanning electron microscope image of the acryloyl-modified $SiO_2$ prepared in Example 1.
Figure 3:
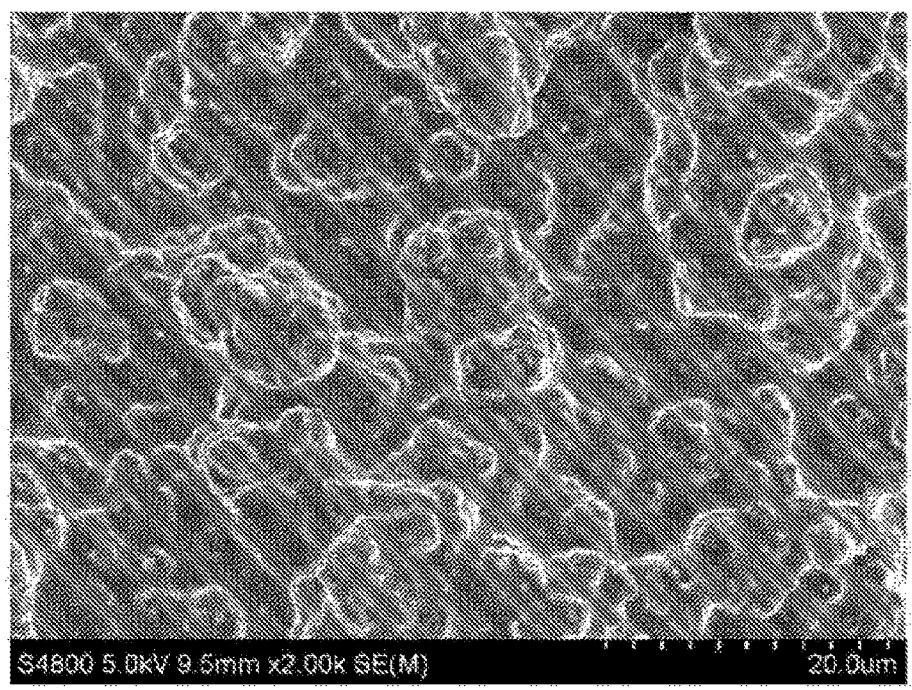
FIG. 3 is a cross-section scanning electron microscope image of the quasi-solid-state electrolyte prepared in Example 1.

From the SEM image in FIG. 1, it can be seen that, the surface of the quasi-solid-state electrolyte prepared in this example was smooth without crack. The quasi-solid-state electrolyte obtained was washed with an acetonitrile solvent for three times to remove the ionic liquid, then vacuum-dried at 70° C. for 12 hours, to obtain acryloyl modified $SiO_2$, SEM morphology characterization was conducted on the acryloyl modified $SiO_2$, as can be seen from FIG. 2, the acryloyl-modified $SiO_2$ has a porous network structure, and this structure was beneficial for loading a great amount of the ionic liquid. It is known from FIGS. 2 and 3 that, in the quasi-solid-state electrolyte prepared in this example, the ionic liquid was filled into the porous network structure. By test, it is determined that the electrical conductivity at 25° C. of the quasi-solid-state electrolyte prepared in this example was 1.37×$10^{-3}$ s/cm, the electrochemical window was 0-4.5 V (vs Li/$Li^+$), and the initial thermal decomposition temperature was 340° C.

Figure 4:
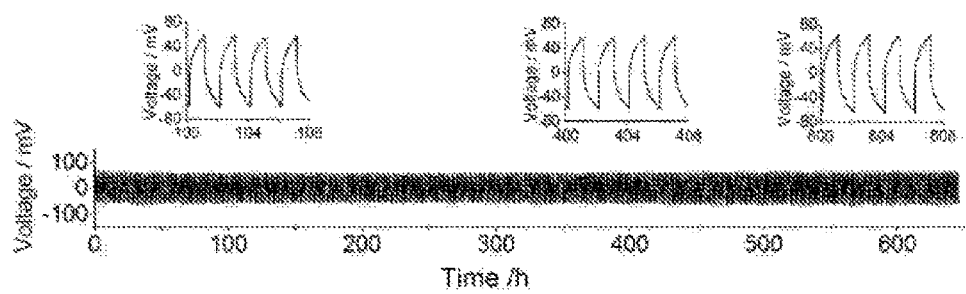
FIG. 4 is a constant current electroplating/stripping diagram measured at a current density of 0.1 mA/cm² of a lithium symmetrical battery prepared by using the quasi-solid-state electrolyte prepared in Example 1.

The quasi-solid-state electrolyte prepared in this example and the lithium sheet were assembled into a lithium symmetrical battery, and an electrochemical performance test was conducted: according to the test result shown in FIG. 4, it is known that the overpotential of the lithium symmetrical battery was 70 mV at a current density of 0.1 mV/cm², with a stable cycle for 600 hours and no short circuit occurred; after the cycle of 600 hours, no lithium dendrite appeared on the interface of the lithium sheet.

Example 2

(1) In a glove box filled with argon gas having a purity greater than or equal to 99% and having a moisture content less than 1 ppm, firstly 1.82 g of LiN(SO$_2$CF$_3$)$_2$ was dissolved in 4.6 g of N-methyl,propylpyrrolidinium bis(trifluoromethylsulfonyl)imide, and stirred for 24 hours to obtain an ionic liquid electrolyte; then 0.7 g of 3-methylacryloyloxypropyltrimethoxylsilane and 0.82 g of 3-methylacryloyloxypropyltriethoxylsilane were added and uniform mixing was conducted; and finally 1.25 mL of formic acid with a purity greater than 98% was added, and stirring was continued for 8 minutes to obtain a reaction system; and (2) The reaction system obtained in the step (1) was removed from the glove box, and placed in a vacuum drying oven with a relative vacuum degree of −100 KPa, and dried at 70° C. for 7 days to obtain an ionic liquid-based quasi-solid-state electrolyte for use in a lithium battery.

From the SEM image of the quasi-solid-state electrolyte prepared in this example, it is known that the surface of the prepared quasi-solid-state electrolyte was smooth without crack, and the ionic liquid was filled into the porous network structure. By test, it is determined that the electrical conductivity at 25° C. of the quasi-solid-state electrolyte prepared in this example was 1.02×10$^{-3}$ s/cm, the electrochemical window was 0-5.0 V (vs Li/Li$^+$), and the initial thermal decomposition temperature was 340° C.

The quasi-solid-state electrolyte prepared in this example and the lithium sheet were assembled into a lithium symmetrical battery, and an electrochemical performance test was conducted. According to the test result, it is know that the overpotential of the lithium symmetrical battery was 60 mV at a current density of 0.032 mV/cm$^2$, with a stable cycle of 1000 hours and no short circuit occurred; after the cycle of 1000 hours, no lithium dendrite appeared on the interface of the lithium sheet.

Example 3

(1) In a glove box filled with argon gas having a purity greater than or equal to 99% and having a moisture content less than 1 ppm, firstly 4.368 g of LiN(SO$_2$CF$_3$)$_2$ was dissolved in 4.6 g of N-methyl,propylpyrrolidinium bis(trifluoromethylsulfonyl)imide and 10.1 g of N-methyl,propylpiperidinium bis(trifluoromethylsulfonyl)imide, and stirred for 24 hours to obtain an ionic liquid electrolyte; then 1.4 g of 3-methylacryloyloxypropyltrimethoxylsilane, 0.82 g of 3-methylacryloyloxypropyltriethoxylsilane and 0.65 g of γ-methylacryloyloxypropylmethyldimethoxylsilane were added and uniform mixing was conducted; and finally 1.62 g of high-purity water was added, and stirring was continued to be performed for 15 minutes to obtain a reaction system; and (2) The reaction system obtained in the step (1) was removed from the glove box, and placed in a vacuum drying oven with a relative vacuum degree of −90 KPa, and dried at 90° C. for 5 days to obtain an ionic liquid-based quasi-solid-state electrolyte for use in a lithium battery.

Form the SEM image of the quasi-solid-state electrolyte prepared in this example, it is known that the surface of the prepared quasi-solid-state electrolyte was smooth without crack, and the ionic liquid was filled into the porous network structure. By test, it is known that the electrical conductivity at 25° C. of the quasi-solid-state electrolyte prepared in this example was 1.8×10$^{-3}$ s/cm, the electrochemical window was 0-5.0 V (vs Li/Li$^+$), and the initial thermal decomposition temperature was 340° C.

Example 4

(1) In a glove box filled with argon gas having a purity greater than or equal to 99% and having a moisture content less than 1 ppm, firstly 0.182 g of LiN(SO$_2$CF$_3$)$_2$ and 0.100 g of LiCF$_3$SO$_3$ were dissolved in 2.3 g of N-methyl,propylpyrrolidinium bis(trifluoromethylsulfonyl)imide and 2.3 g of N-methyl,butylpyrrolidinium bis(trifluoromethylsulfonyl)imide, and stirred for 24 hours to obtain an ionic liquid electrolyte; then 2.8 g of 3-methylacryloyloxypropyltrimethoxylsilane were added and uniform mixing was conducted; and finally 3.6 mL of formic acid with a purity greater than 98% was added, and stirring was continued for 8 minutes to obtain a reaction system; and (2) The reaction system obtained in the step (1) was removed from the glove box, and placed in a vacuum drying oven with a relative vacuum degree of −100 KPa, and dried at 80° C. for 7 days to obtain an ionic liquid-based quasi-solid-state electrolyte for use in a lithium battery.

The surface of the prepared quasi-solid-state electrolyte was smooth without crack, and the ionic liquid was filled into the porous network structure. By test, it is known that the electrical conductivity at 25° C. of the quasi-solid-state electrolyte prepared in this example was 1.02×10$^{-5}$ s/cm, the electrochemical window was 0-5.0 V (vs Li/Li$^+$), and the initial thermal decomposition temperature was 340° C.

Example 5

(1) In a glove box filled with argon gas having a purity greater than or equal to 99% and having a moisture content less than 1 ppm, firstly 0.662 g of LiC(SO$_2$CF$_3$)$_3$ and 0.247 g of LiCF$_3$SO$_3$ were dissolved in 4.6 g of N-methyl, butylpyrrolidinium bis(trifluoromethylsulfonyl)imide, and stirred for 24 hours to obtain an ionic liquid electrolyte; then 2.8 g of 3-methylacryloyloxypropyltrimethoxylsilane was added and uniform mixing was conducted; and finally 3.6 mL of formic acid with a purity greater than 98% was added, and stirring was continued for 8 minutes to obtain a reaction system; and (2) The reaction system obtained in the step (1) was removed from the glove box, and placed in a vacuum drying oven with a relative vacuum degree of −100 KPa, and dried at 70° C. for 7 days to obtain an ionic liquid-based quasi-solid-state electrolyte for use in a lithium battery.

The surface of the prepared quasi-solid-state electrolyte was smooth without crack, and the ionic liquid was filled into the porous network structure. By test, it is known that the electrical conductivity at 25° C. of the quasi-solid-state electrolyte prepared in this example was 1.12×10$^{-3}$ s/cm, the electrochemical window was 0-5.0 V (vs Li/Li$^+$), and the initial thermal decomposition temperature was 340° C.

The quasi-solid-state electrolyte prepared in this example and a lithium sheet were assembled into a lithium symmetrical battery, and an electrochemical performance test was conducted: according to the test result, it is known that the overpotential of the lithium symmetrical battery was 0.4 mV at a current density of 0.5 mV/cm$^2$, with a stable cycle of 1000 hours and no short circuit occurred; after the cycle of 1000 hours, no lithium dendrite appeared on the interface of the lithium sheet.

In conclusion, the above are merely preferable examples of the present disclosure, and not intended to restrict the protection scope of the present disclosure. Any modifications, equivalents, substitutions, and improvements made within the spirit and principle of the present disclosure are all included in the protection scope of the present disclosure.

The invention claimed is:

1. An ionic liquid-based quasi-solid-state electrolyte for use in a lithium battery, wherein the quasi-solid-state electrolyte is of a porous network structure which is obtained by a condensation reaction of a lithium salt, ionic liquid, a silane coupling agent and a catalyst; wherein:
the lithium salt is one or more of $LiN(SO_2CF_3)_2$, $LiCF_3SO_3$ and $LiC(SO_2CF_3)_3$;
the silane coupling agent is an organosilicon compound containing an acryloyl group selected from the group consisting of 3-methylacryloyloxypropyltrimethoxysilane, γ-methylacryloyloxypropylmethyldimethoxysilane, and 3-methylacryloyloxypropyltriethoxylsilane; and
the catalyst is formic acid, acetic acid or water.

2. The ionic liquid-based quasi-solid-state electrolyte according to claim 1, wherein the ionic liquid is an ionic liquid in which the anion is a bis(trifluoromethylsulfonyl)imide salt.

3. The ionic liquid-based quasi-solid-state electrolyte according to claim 2, wherein the ionic liquid is one or more of 1-ethyl-3-methylimidazolium bis(trifluoromethylsulfonyl)imide, 1-propyl-3-methylimidazolium bis(trifluoromethylsulfonyl)imide, 1-butyl-3-methylimidazolium bis(trifluoromethylsulfonyl)imide, N-methyl,propylpiperidinium bis(trifluoromethylsulfonyl)imide, N-methyl,butylpiperidinium bis(trifluoromethylsulfonyl)imide, N-methyl,propylpyrrolidinium bis(trifluoromethylsulfonyl)imide, and N-methyl,butylpyrrolidinium bis(trifluoromethylsulfonyl)imide.

4. A preparation method of the ionic liquid-based quasi-solid-state electrolyte according to claim 1, the method comprising the steps as follows:

(1) firstly dissolving a lithium salt selected from the group consisting of $LiN(SO_2CF_3)_2$, $LiCF_3SO_3$ and $LiC(SO_2CF_3)_3$ in an ionic liquid in a glove box filled with a protective gas and having a moisture content less than 1 ppm and performing uniform stirring to obtain an ionic liquid electrolyte; then adding a silane coupling agent selected from the group consisting of 3-methylacryloyloxypropyltrimethoxysilane, γ-methylacryloyloxypropylmethyldimethoxysilane, and 3-methylacryloyloxypropyltriethoxylsilane, performing uniform mixing, finally adding a catalyst and performing uniform mixing to obtain a reaction system; and (2) removing the reaction system from the glove box, and placing the reaction system in a vacuum drying oven with a relative vacuum degree of −70 KPa to −100 KPa, and performing drying at 25° C.-90° C. to obtain the quasi-solid-state electrolyte;

wherein the protective gas is nitrogen gas or argon gas with a purity not less than 99%.

5. The preparation method of the ionic liquid-based quasi-solid-state electrolyte according to claim 4, wherein in the ionic liquid electrolyte, the concentration of the lithium salt is 0.35 mol/L-2 mol/L, the mass ratio of the silane coupling agent to the ionic liquid electrolyte is (0.15-0.6):1, and the molar ratio of the catalyst to the silane coupling agent is (5.5-8.5):1.

* * * * *